Sept. 5, 1961   E. E. THOMAS   2,998,809
IMPROVEMENTS IN MOTOR VEHICLE AUTOMATIC TRANSMISSION CONTROLS
Original Filed April 1, 1959
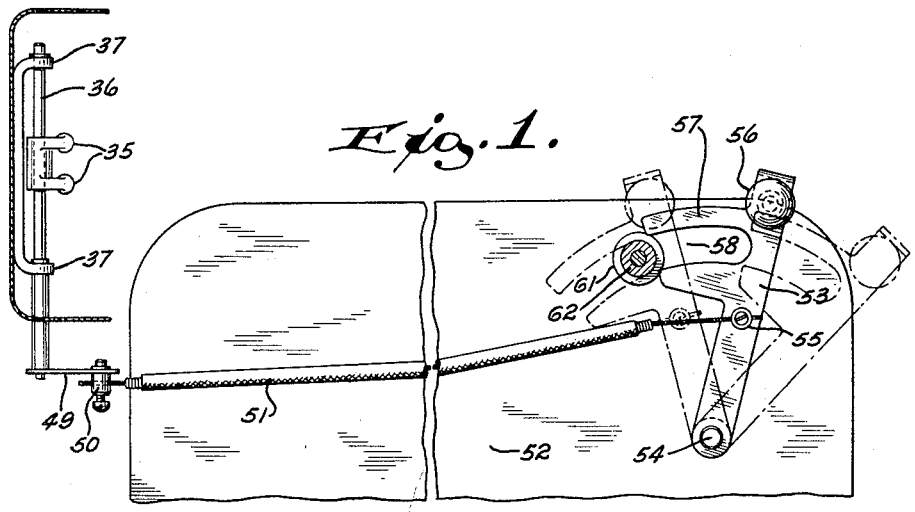
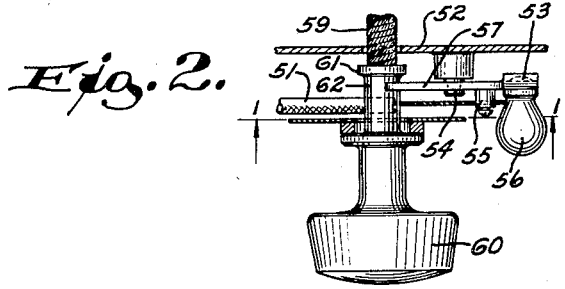
INVENTOR.
Edward E. Thomas,
BY
Morsell & Morsell
ATTORNEYS.

United States Patent Office 2,998,809
Patented Sept. 5, 1961

2,998,809
IMPROVEMENTS IN MOTOR VEHICLE AUTOMATIC TRANSMISSION CONTROLS
Edward E. Thomas, Milwaukee, Wis., assignor to Harley-Davidson Motor Co., Milwaukee, Wis., a corporation of Wisconsin
Original application Apr. 1, 1959, Ser. No. 803,388. Divided and this application Feb. 15, 1960, Ser. No. 8,794
2 Claims. (Cl. 123—179)

This invention relates to improvements in motor vehicle automatic transmission controls, and more particularly to an automatic power transmission control means, particularly suited for lightweight motor vehicles such as motor scooters, motor tricycles, small motor cars, and the like, and is a division of my application, Serial No. 803,388, filed April 1, 1959, now U.S. Patent No. 2,987,934.

A general object of the invention is to provide, in an automatic power transmission for motor vehicles having a manual control lever for selectively locking out the centrifugal means acting on the variable primary sheave, means acting in conjunction with the centrifugal lock-out control lever arrangement for permitting free actuation of the rewind starter in its "start" position, but which, when said control lever is in its "run" position releasing the lock-out of the centrifugal means, automatically locks the handle of the rewind starter to prevent operation thereof.

A further object of the invention is to provide, in an automatic power transmission of the character described, means associated with the sliding section of the primary variable sheave and extending to the control panel of the vehicle for manually moving said sliding sheave section into belt engagement whereby the vehicle's engine may be started through the power transmission device by pushing the vehicle.

A further object of the invention is to provide an automatic power transmission control means for motor vehicles for transmitting power from the motor to the driving wheels of the vehicle, which transmission is automatically speed responsive, is accessible for operation at the control panel of the vehicle, which is strong and durable, which is efficient in operation, and which is well adapted for the purposes described.

With the above and other objects in view, the invention consists of the improved automatic power transmission control means, and its parts and combinations as set forth in the claims, and all equivalents thereof.

In the accompanying drawings, in which the same reference characters indicate the same parts in all of the views:

FIG. 1 is a fragmentary view looking at a face of the control panel showing the Bowden control and its manual shift lever for moving the lock-out spider and attached pins of the transmission control means associated with a driving bell, and the lock for the rope starter handle; the view being taken approximately along the line 1—1 of FIG. 2; and FIG. 2 is a horizontal sectional view through the control panel showing the manual control lever and the locking means for the rope starter handle.

As will appear from U.S. Patent No. 2,987,934 a motor vehicle automatic transmission includes a driving bell having mounted there-adjacent a rock shaft 36 which carries spider shifting arms 35. An outer end portion of the rock shaft 36 has secured thereto the inner end portion of a lever arm 49 whose outer end portion has affixed thereto a connecting protuberance 50 to which is affixed one end portion of a Bowden control 51. Mounted at any convenient location on the vehicle, as on a control panel 52, is a manual control lever 53, the latter having its inner end pivotally mounted on the support or panel 52, as at 54. The other end portion of the Bowden control 51 is affixed to an intermediate portion of the control lever 53, as at 55. The outer end portion of the control lever 53 carries a knob 56 for manual manipulation of the control lever and a portion of the control lever, inwardly of its outer extremity, is formed with a bifurcated lateral plate portion 57 having an arcuate slot 58 therein.

A starter operating rope or cable 59 extends slidably through the panel or support 52 and its outer end carries an operating knob 60 with a reduced shank portion 62 having thereon a flange or collar 61 spaced so that when the control lever 53 is swung from the full line position of FIG. 1 to the broken line position toward the left the reduced shank portion 62 will be received by the slot 58 of the lateral plate portion 57 of the lever, but the flange 61 on the starter operating knob shank underlies the stock of the lateral plate portion 57 adjacent the slot to lock the starter rope handle against being pulled outwardly. This arrangement will, therefore, prevent a pull on the starter rope 59 when the control lever 53 is in the broke line position toward the left of FIG. 1.

In an internal combustion engine operated motor vehicle equipped with the improved automatic transmission of Patent No. 2,987,934 and the control means therefor, when the engine is initially started through an outward pull on the starter rope 59, the control lever 53 should be in the full line position of FIG. 1. In this original position of the control lever 53, through the Bowden control 51, the rock shaft 36 will be in a position wherein the arms 35 are in a position to force a spider and centrifugal weight controlling pins to a position wherein the force of the springs, acting on the spring retaining plates, through the driving pins, will cause the shiftable sheave section to be in its spread position relative to the fixed sheave section. In this condition a belt will seat deeply within the groove of the driving sheave resting on an idling bearing. The sections of the driven sheave 20 will be close together so that the belt will engage the groove of the driven sheave in a position approaching the maximum effective radius thereof. With this arrangement, the engine of the vehicle is started in the conventional manner through a pull on the starter rope 59 and the engine can be initially speeded up without obtaining forward motion of the vehicle through the automatic transmission, because the centrifugal weights are locked in their innermost positions, and hence do not then react against surface portions of the shiftable sheave section allowing the belt to remain on the idling bearing which does not transmit power. Rotary motion from the driving shaft via the driving bell is, however, transmitted to the sheave section by certain driving pins, all as is explained in Patent No. 2,987,934. After the vehicle engine has been suitably warmed up, the engine r.p.m. is reduced by means of a throttle (not shown) and the control lever 53 is manually shifted from the full line position of FIG. 1 to the broken line position toward the left of FIG. 1 which, through the Bowden control 51, lever 49 and rock shaft 36, swings the arms 35 to a position whereby a spider is shifted to a position which allows centrifugal weights to be thrown radially outwardly in their channels by centrifugal action, following speeding up of the engine. It should be observed that when the control lever 53 is shifted to the broken line position toward the left of FIG. 1, it then lockingly engages the shank of the starter rope handle, as previously described, preventing operation of the recoiling starter rope.

For another operation the lever 53 is moved to the broken line position shown at the right in FIG. 1. Which makes it possible to effect a push start of the vehicle because the transmission belt is then not tightly or drivingly engaged by both sections of the primary sheave when said sheave is spread.

The improved automatic power transmission control means is compact, light, and efficient in operation and is well suited for the purposes set forth.

What is claimed as the invention is:

1. A control mechanism for the automatic power transmission of a motor vehicle comprising a support; a manual control lever movably mounted on a face of said support and movable between first and second positions; connections extending to said control lever to be operated by movements of the latter; and an engine starter element movably mounted on said support for reciprocation in a path transverse to the path of movement of the control lever, said engine starter element having a shouldered protuberance located adjacent the second position of the control lever, and the latter having a bifurcated portion to engage the shouldered protuberance and prevent reciprocal movement of the engine starter element when the control lever is manually moved to the second position.

2. A control mechanism, comprising a support, a manual control lever movably mounted on said support, a control connection secured at one end to said control lever to be moved thereby, said control lever having a first position and a second position, an engine starter element reciprocatably mounted on the support in the path of movement of the control lever when it is moved to one of its positions, and cooperating engaging slot and shoulder means formed on the control lever and engine starter element to prevent reciprocation of said starter element when the control lever is manually moved into engagement with the engine starter element.

References Cited in the file of this patent

UNITED STATES PATENTS

| | | |
|---|---|---|
| 1,563,527 | Ross | Dec. 1, 1925 |
| 1,732,851 | Littler | Oct. 22, 1929 |
| 2,438,455 | Roeder et al. | Mar. 23, 1948 |
| 2,927,571 | Kamlukin | Mar. 8, 1960 |
| 2,938,511 | Pike et al. | May 31, 1960 |